June 26, 1956  C. A. HUGGINS  2,752,139
GAS-LIQUID CONTACT APPARATUS
Filed Oct. 1, 1952
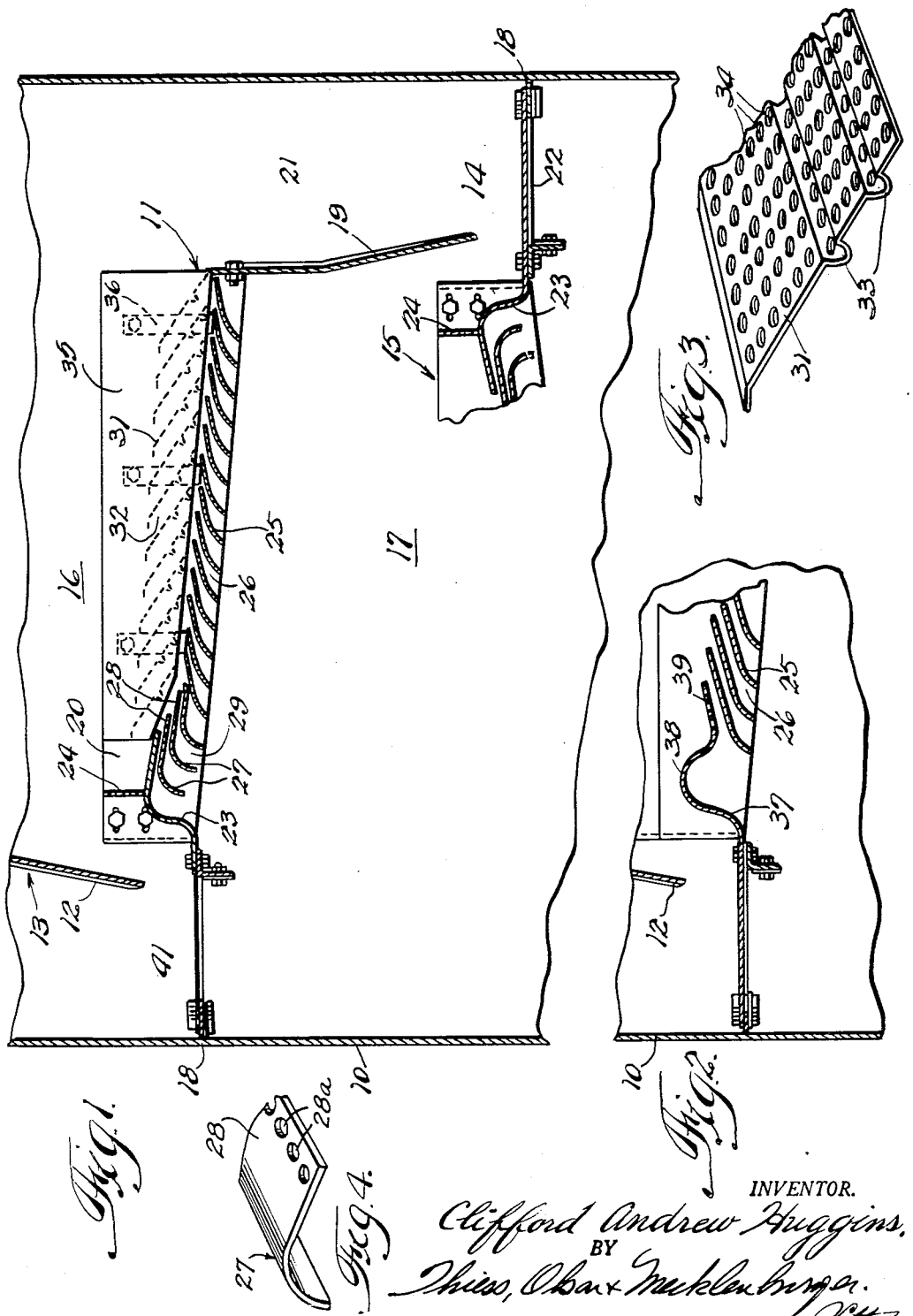
INVENTOR.
Clifford Andrew Huggins,
BY
Thiess, Olsen & Mecklenburger
Attys.

_United States Patent Office_

2,752,139
Patented June 26, 1956

2,752,139

GAS-LIQUID CONTACT APPARATUS

Clifford Andrew Huggins, Wichita, Kans., assignor to Koch Engineering Company, Inc., Wichita, Kans., a corporation of Kansas Application October 1, 1952, Serial No. 312,546

4 Claims. (Cl. 261—114)

This invention relates to the gas-liquid contact art and has for a principal object the provision of an improved apparatus for contacting gases and liquids.

It is a further object of this invention to provide improved gas-liquid contact apparatus wherein low liquid loads may be utilized.

In the gas-liquid contact art, and particularly the art of dephlegmation or fractionation, an important consideration is to provide equipment which will permit liquids and gases or vapors to be thoroughly contacted and then disengaged whereby gases or vapors and liquids are withdrawn from the equipment as separate products. In the past it has been the usual practice to provide a gas-liquid contact chamber or tower including a plurality of transverse trays through which the gases or vapors pass and over which the liquid flows. Such trays known to the art are the usual bubble trays, perforated trays, and the like. Many of the prior art trays, however, have not been entirely satisfactory since only limited quantities of liquid and gas can be passed through a tray of a given size and also because of the large pressure drops occurring across each individual tray.

Accordingly, it is another object of this invention to provide apparatus in which relatively large quantities of liquids and gases may be rapidly and efficiently contacted with each other.

It is a still further object of this invention to provide improved apparatus for intimately contacting liquids and gases in such a manner that only a small pressure drop occurs across the contacting section.

A still further object of this invention is the provision of a gas-liquid contact tray which may be readily installed in conventional gas-liquid contacting towers or chambers.

A still further object of this invention is the provision of a gas-liquid contact tray which is simple to construct and which may readily be modified to conform to desired conditions within the tower whereby efficient gas-liquid contact is achieved.

It is another object of this invention to provide improved gas-liquid contact apparatus wherein a preliminary break-up of said liquid is effected to insure more complete contact with the commingled gas especially in a tray adapted for use with low liquid loads.

It is still another object of this invention to provide an improved gas-liquid contact tray wherein the uniform distribution of liquid thereover may be readily achieved.

Further and additional objects of this invention will appear from a consideration of the following description, the accompanying drawings, and the appended claims.

The teachings herein disclosed are in the nature of improvements over the structure disclosed in a copending patent application entitled "Gas-Liquid Contact Process and Apparatus," Serial No. 243,240, of Clifford Andrew Huggins, and assigned to the same assignee.

In accordance with one embodiment of this invention, a gas-liquid contact tray is provided which may be installed transversely in the usual type of fractionating or dephlegmating tower. The tray comprises a plurality of substantially coextensive elongated baffle elements that are arranged to form a generally horizontal contact area over which the liquid flows. Each of the baffle elements is in the form of an inverted trough, preferably curvilinear in cross section, each having a lower surface lying within a generally vertical plane and an upper surface lying within a generally horizontal plane. The baffle elements are arranged in spaced overlapping relationship, and one or more of the baffles near the liquid receiving end of the contact area are provided with perforations. In operation, vapors or gases pass upwardly through the tray between the elongated baffle elements and are diverted transversely across the upper surface of the tray in the direction of the normal flow of liquid thereover. The flow of liquid over the tray is controlled by a weir member which serves to distribute the liquid over the tray from a downcomer. The weir member is preferably perforated in such a manner that the liquid is evenly and uniformly distributed onto the contact tray. One or more of the baffle plates adjacent the weir member are provided along their upper edges with a plurality of perforations. Thus the liquid flowed onto the tray or horizontal contact area first passes through perforate areas of one or more of the inductor baffles located near the liquid receiving end of the contact tray whereby the liquid stream is broken up into small streams for intimate contact with the vapors which are passing through the tray between the baffles to the contact area at a relatively high velocity. This preliminary break-up facilitates initial movement of the liquid across the tray especially for low liquid loads, serves to prevent runback of liquid between the baffle elements, and prevent smothering of the gases or vapors in the areas of the first inductor baffles.

Thus, by the aforementioned structure, the gases or vapors pick up the liquid by entrainment, thus causing a thorough contact between the liquid and the vapors or gases. The gas-liquid contact is complete near the upstream area of the tray and continuous throughout its entire length, the liquid is moved rapidly over the surface, and the liquid load may be varied over a wide range without affecting the thoroughness of the contacting operation. To effect disengagement of the gas and liquid above the surface of the tray, a plurality of perforated disengaging plates may be provided which extend in an upward direction and which have their lower edges spaced above the upper surfaces of the baffle elements. In accordance with another embodiment of this invention, these plates are provided with substantially horizontal corrugations. These corrugations serve to stiffen the disengaging plates but, more important, provide means tending to hold the liquid down near the upper surface of the tray whereby more efficient contacting under low liquid load conditions is obtained.

If desired, the baffle elements comprising the main body portion of the tray may be arranged in a horizontal plane with the gas discharge openings therebetween being directed in a direction inclined somewhat to the horizontal, or the baffle plates may be arranged in downwardly stepwise relationship with the openings between them serving to discharge vapors over the surface of the tray in a substantially horizontal plane. The latter mode of construction may be preferred where it is desired to minimized the pressure drop occurring across each tray as gravity tends to assist the flow of liquid thereacross. In accordance with the one embodiment of the invention herein described in detail, the initial inductor baffle elements at the liquid receiving end of the tray are steeply stepped to produce rapid initial liquid flow, even for low liquid loads. In addition, the vapor discharge path may be slightly depressed below the horizontal, thus imparting additional acceleration to the liquid.

From a more complete understanding of the invention, reference will now be made to the accompanying drawings, wherein Figure 1 is a fragmentary, somewhat diagrammatic, sectional view of a gas-liquid contact tower embodying this invention;

Fig. 2 is an enlarged, fragmentary view of the liquid receiving portion of a contact tray showing a modified baffle and weir;

Fig. 3 is a detailed view of a portion of one of the disengaging plates of the contact tray shown in Fig. 1, and Fig. 4 is a partial end view of one of the perforated baffle elements shown in Fig. 1.

Referring now to the drawing and more particularly to Fig. 1, there is shown a conventional fractionating column or tower 10 having a plurality of spaced trays positioned therein. One such tray 11 is shown in its entirety while a downcomer 12 of a tray 13 above the tray 11 and a seal pan 14 and portion of a tray 15 below are shown. These trays define a plurality of vertically spaced gas-liquid contact zones 16 and 17 through which vapors pass upwardly in the tower 10 in a manner hereinafter more fully described. Each of the trays 11, 13, and 15 is supported by means of conventional flanges 18 welded or otherwise secured to the inner wall of the tower 10. All of the trays within the tower 10 will have the same general features of construction, and though the discussion hereinafter will be directed more specifically to the structure of tray 11, it should be clear that it is equally applicable throughout the tower. Depending from the tray 11 is a downcomer baffle element 19 which, in cooperation with the side wall of the tower 10, forms a downcomer 21 for the passage of liquid downwardly from the liquid discharge end of contact tray 11 to the liquid receiving end of the tray 15. Adjacent the lower portion of the downcomer 21 is a seal pan 14 having a base 22 and upright walls comprising a first inductor baffle 23 of the tray 15 and the side wall of the tower 10. A perforate weir member 24 extends transversely across the tray area above the first inductor baffle 23. The downcomer baffle 19 extends downwardly a distance sufficient to be immersed in the liquid which collects in the seal pan 14, thus providing a trap whereby the ascending vapors will be forced up through the baffle portion of the tray and cannot pass upwardly through the downcomer. In operation, the liquid level in the seal pan 14 will rise above the first inductor baffle 23 and will thus flow through the perforations in the weir member 24, whereby the liquid is distributed over the entire contact area in any predetermined manner.

As clearly shown by the tray 11 of Fig. 1, each of the contact trays comprises a plurality of elongated horizontally arranged baffle elements 25 positioned in spaced overlapping relationship. The series of transversely extending baffle elements 25 extends in a substantially horizontal plane and provides a transversely interrupted contact surface over which liquid flows in operation. Each of the baffle elements 25 is curvilinear in cross section and presents adjacent the lower edge a surface which lies within a generally vertical plane and presents adjacent the upper edge a surface lying within a generally horizontal plane. Thus it will be seen that the tray comprises a series of elongated openings 26, the several baffles being so shaped that the top of each opening is considerably more restricted than the bottom thereof. Thus when the vapors pass upwardly through the openings 26, they initially move at a relatively low velocity but are jetted or hurled at a relatively high velocity over the surface of the tray in the general direction of the movement of the liquid thereover.

In the embodiment shown in Fig. 1 the first baffle element 23 serves as a weir in cooperation with the perforated weir member 24 as described above. The next two successive baffle elements 27 are stepped downwardly with the upper edge of each projecting out beyond the upper edge of the one immediately above so that liquid passing over the first baffle 23 and through the apertures in the weir 24 has a tendency to cascade from the upper edge of one of the baffle elements 27 to the upper surface of the baffle element adjacent to and below it. The two stepped-down baffle elements 27 are perforated at their upper surface 28 by perforations 28a to break up the stream of liquid passing thereover. By reason of this breakup the liquid is more readily picked up by the vapors in this first part of the tray, thereby preventing smothering and runback in the area near the liquid receiving end of the tray, and the initial movement of the liquid thereacross is facilitated. This is found especially desirable in towers utilizing low liquid loads. The liquid will thereafter be hurled or projected across the top of the tray by contact with the vapor moving at relatively high velocity through the successive openings 26.

Preferably a plurality of upwardly extending corrugated gas-liquid disengaging plates 31 are provided which are substantially coextensive with the baffle plates 25. These plates 31 are perforated and have their lower edges spaced above the upper edges of the baffle elements to permit liquid to flow thereunder. However, any foam or mist that is motivated by the jetting action of the ascending vapors into the space 32 between the plates 31 will be projected against one of them and the resulting impingement serves to disengage the liquid from the vapor.

As shown more clearly in the fragmentary view of Fig. 3, the disengaging plate 31 is constructed preferably of a perforate metal sheet having longitudinal corrugations 33 therein which run transversely across the tower 10. The corrugations project upstream and tend to prevent the gas-liquid foam from rising above the tray any substantial distance and facilitate the disengagement of the gas from the liquid. Thus, as the foam or mist begins to rise above the surface of the contact tray, it will come into contact with the lower surface or underside of the disengaging plate 31. The shapes of the corrugations have a tendency to produce a turbulence in the foam which will increase the efficiency of gas-liquid disengagement and hold the foam down on the tray. The perforations 34 in the plates 31 further assist in disengaging the liquid from the vapor.

The disengaging plates 31 are mounted between end members 35, one of which is shown in elevation in the sectional view of Fig. 1. The plates 31 are secured to the end members 35 by any suitable means, such as welding, to form an integral unit which may be secured to or removed from the body of the tray 11. A plurality of attaching uprights 36 are secured to the end members 20 of the tray 11 and rise in juxtaposition to the end members 35. The uprights 36 have apertures therein to receive bolts or the like which will secure the end plates 35 to the tray 11.

The complete tray assembly may be composed of a plurality of subassemblies secured together to form an integral structure. A typical sectional structure is disclosed in the above-referred-to patent application Serial No. 243,240. Each tray section comprises a plurality of baffle elements 25 secured between end members 20, and these sections are then assembled with the end members 20 in side-by-side relation to provide a complete horizontal tray extending transversely across the tower 10. Thus though the tray is made up of a plurality of separate sections, it in effect comprises a series of elongated baffle elements and disengaging plates extending entirely across the opening in the tower.

An alternate weir structure is shown in the embodiment of Fig. 2 wherein the first inductor baffle 37 is formed to have a high inverted trough 38 which serves as a weir member. The baffle 37 is further extended to form a perforate upper surface 39 which will serve in a manner similar to that described with respect to baffles 27 of Fig. 1.

In the operation of the device disclosed herein, gas or vapor is passed upwardly through the tower 10. With particular reference to tray 11, these gases move upwardly through the lower zone 17 to the under side of the tray. The vapors are prevented from escaping upwardly through the downcomer 21 by the liquid in the seal pan 14, as described above. Thus the vapors pass through the openings 26 between the baffle plates 25, as well as through the openings 29 between the baffle plates 27. Inasmuch as the openings 26 are enlarged on the under side of the tray but are restricted on the upper side of the tray, the vapors or gases greatly increase their velocity as they pass through the tray. Also their direction is changed so that there is provided in effect a plurality of parallel, relatively high velocity flat vapor streams which are discharged across the upper surface of the tray in generally the same direction of movement as that of the liquid across the upper surface of the tray.

While the vapors are passing through the tray 11 in the manner just described, the liquid from the seal pan 41 passes over the rearward surface of the first baffle 23 and through the perforate weir 24 where the liquid is evenly distributed over the entire length of the baffle element 23. This even distribution is effected by adjusting the size and number of the perforations in the weir 24 in relation to the liquid flow so that the liquid level in the seal pan 41 will always flood at least some of the perforations along the entire length of the weir member. Thus the liquid will be distributed evenly by the weir even though there may be slight irregularities in height along its length. Thereafter the liquid cascades downwardly across the tray over the upper surfaces of the baffle elements 27 where a portion of the liquid is broken up by flowing through the perforations 28a in the upper surfaces 28 and contacted by the ascending vapor. Thereafter the flow of liquid proceeds over the upper surfaces of baffles 25. Due to the high velocity of the vapors moving upwardly and horizontally through the tray, the liquid cannot run down the surfaces of the baffle elements 25 into the zone 17 below. Therefore, these vapors force the liquid to move across the horizontal contact surface from one baffle element to the next. At the same time a portion of the liquid is picked up by the high velocity vapor to form a foam or mist which is projected against the surfaces of the plates 31 which serve to hold the material down in the contact area and to effect disengagement of the vapor and liquid. Gas-liquid contact and disengagement are effected with good efficiency by first utilizing the perforated initial inductor baffles 27 to effect more efficient contact, and by the use of the corrugated disengagement plates 31 to disentrain the liquid.

The gases or vapors then proceed upwardly through the zone 16 to the succeeding contact tray where the operation is repeated. The disengaged liquid flows across the tray over the remaining baffle plates 25 where that operation is repeated and ultimately into the downcomer 21 where it is passed to the next lower tray 15. It will be understood that if the volume of liquid flowing across the tray is relatively large, a percentage of it may not be hurled against the plates 31 but may move as a highly turbulent layer flowing across the tray to be discharged to the downcomer.

The position, angle, and character of the disengaging plates 31 may be modified to control to a degree the pressure drop across the tray. By raising the plates, or by increasing the plate angle, or by increasing the size or number of perforations the pressure drop may be reduced. By increasing the number and size of the corrugations, the pressure drop may be increased, but the effect will be to hold the liquid near the tray surface. An important consideration is that the greater the resistance to the free passage of gases and vapors, the greater the pressure drop across the tray.

It will be understood that various baffle configurations may be utilized without departing from the teaching of this invention. The baffles may direct the vapor streams in substantially horizontal paths as shown in Fig. 1, where the successive baffles are in a stepped-down relationship, or the streams may be elevated from the horizontal to lift the liquid passing over the tray with the baffles being arranged in a horizontal plane.

Thus it will be seen that an improved tray has been provided for contacting gases and liquids. The invention is particularly applicable in the art of fractionation or distillation where it is desired to separate large quantities of liquids and vapors with a minimum but controllable pressure drop across the equipment. The apparatus herein disclosed is especially applicable to equipment wherein the liquid load is relatively low, thus necessitating improved contacting without smothering or runback at the liquid receiving end of each tray.

As will be apparent from the foregoing, the specific trays herein described are merely exemplary, and it will be clear to one skilled in the art that the specific trays shown may be altered to fit varying requirements, and this adaptability is one important feature of this invention. For example, various trays using perforate weirs or baffles may be combined with any number of different sets of disengaging plates having corrugations or perforations whereby the equipment may be adapted for use under any given conditions of vapor pressure and liquid load.

While several embodiments of the invention are herein shown, it will be clearly understood, of course, that the invention is not to be limited thereto since many modifications may be made, and it is contemplated by the appended claims to cover any such modifications as fall within the true spirit and scope of this invention.

I claim:

1. A gas-filled contact tray having a liquid receiving end and a liquid discharge end for flowing a liquid across the upper surface thereof comprising a plurality of spaced elongated baffle plates having substantially parallel longitudinal axes arranged transversely of the direction of movement of liquid flowed across said tray, each of said plates being in the form of an inverted trough with the lower portion thereof arranged in an upwardly extending plane and with the upper portion thereof lying within a transverse plane, said upper portions of said baffle plates overlapping the corresponding portions of adjacent baffle plates and collectively defining the lower portion of a substantially unobstructed liquid passageway over the upper surface of said tray for the unobstructed flow of liquid thereover between said ends, the overlapping portions of the baffle plates being spaced more closely together than the lower portions of the corresponding plates thereby forming gas passageways through said tray which direct gas from underneath said tray across the upper surface thereof into said liquid passageway in the direction of movement of said liquid between said ends whereby liquid movement in said direction across the upper surface of said tray in said liquid passageway is assisted, said upper surface of at least one of said baffle plates adjacent the liquid receiving end being provided with perforations arranged transversely of the direction of movement of liquid across said tray, whereby initial breakup of liquid passing across said tray is effected.

2. The tray recited in claim 1 wherein said plates have a curvilinear cross section.

3. A gas-contact liquid tower comprising a plurality of vertically spaced zones; a transversely disposed contact tray in each zone; means for flowing liquid onto an upper surface of each tray from a zone above at a liquid-receiving end; means for discharging liquid from said tray to a zone below at a liquid-discharging end; each of said contact trays comprising a plurality of spaced elongated baffle plates having substantially parallel longitudinal axes arranged transversely of the direction of movement of liquid flowed across said tray, each of said plates having a curvilinear cross section with the lower portion thereof arranged in an upwardly extending plane and with the upper portion thereof lying within a transverse plane, said upper portions of said baffle plates overlapping the corresponding portions of adjacent baffle plates and collectively defining the lower portion of a substantially unobstructed liquid passageway over the upper surface of said tray for the unobstructed flow of liquid thereover between said ends, the overlapping portions of the baffle plates being spaced more closely together than the lower portion of the corresponding plates thereby forming gas passageways through said tray which directs gas from underneath said tray across the upper surface thereof into said liquid passageway in the direction of movement of said liquid between said ends whereby liquid movement in said direction is assisted across the upper surface of said tray in said liquid passageway, said upper surface of at least one of said baffle plates adjacent the liquid-receiving end being provided with perforations arranged transversely of the direction of movement of liquid across said tray whereby initial breakup of liquid passing across said tray is effected; and a plurality of elongated perforated vapor-disengaging plates in said contact zones having longitudinal axes substantially parallel to the longitudinal axes of said baffle plates, each of said vapor-disengaging plates lying in an upwardly extending plane and having its lower side edge spaced above the upper portions of the baffle plates of the contact tray immediately below, said lower side edges collectively defining a surface constituting the upper portion of said liquid passageway.

4. The tower recited in claim 3 wherein said vapor-disengaging plates lie in a plane inclined upwardly toward said liquid-receiving end and at least one is provided with a longitudinal deformation extending outwardly from the under surface thereof toward the tray below.

References Cited in the file of this patent

UNITED STATES PATENTS

| | | |
|---|---|---|
| 468,919 | Rettenmeyer | Feb. 16, 1892 |
| 489,147 | Golding | Jan. 3, 1893 |
| 829,700 | Drees | Aug. 28, 1906 |
| 1,319,572 | DiSante | Oct. 21, 1919 |
| 1,434,301 | Liljegran | Oct. 31, 1922 |
| 2,010,010 | Chillas | Aug. 6, 1935 |
| 2,349,944 | Dixon | May 30, 1944 |
| 2,510,590 | Kraft | June 6, 1950 |
| 2,678,201 | Koch | May 11, 1954 |
| 2,681,219 | Thrift et al. | June 15, 1954 |

FOREIGN PATENTS

| | | |
|---|---|---|
| 839,695 | France | Jan. 7, 1939 |